United States Patent [19]

Jahn-Held et al.

[11] Patent Number: 4,886,393

[45] Date of Patent: Dec. 12, 1989

[54] PRETREATMENT OF SOLID WASTES, AND WASTES TO BE COMPACTED, FOR INTRODUCTION INTO UNDERGROUND SALT CAVITIES OF SALT CAVERNS VIA A DOWNPIPE UNDER THE FORCE OF GRAVITY

[75] Inventors: Wilhelm Jahn-Held, Staufenberg; Walter Lindoerfer, Kassel; Friedel Wartenpfuhl, Giesen, all of Fed. Rep. of Germany

[73] Assignee: Wintershall Aktiengesellschaft, Kassel, Fed. Rep. of Germany

[21] Appl. No.: 4,611

[22] Filed: Jan. 20, 1987

[30] Foreign Application Priority Data

Jan. 20, 1986 [DE] Fed. Rep. of Germany ....... 3601428

[51] Int. Cl.$^4$ ............................. B09B 3/00; B09B 1/00
[52] U.S. Cl. ................................... 405/128; 405/258; 405/267
[58] Field of Search .................. 405/128, 129, 53, 55, 405/57, 58, 54, 264, 267

[56] References Cited

U.S. PATENT DOCUMENTS

| | | | |
|---|---|---|---|
| 3,196,619 | 7/1965 | Shock | 405/128 |
| 3,665,716 | 5/1972 | Rogers et al. | 405/128 |
| 4,338,134 | 6/1982 | Graf zu Munster | 405/128 X |
| 4,342,732 | 8/1982 | Smith | 405/128 X |
| 4,432,666 | 2/1984 | Frey et al. | 405/129 |
| 4,456,400 | 6/1984 | Heide et al. | 405/128 |
| 4,600,514 | 7/1986 | Conner | 405/129 X |
| 4,668,128 | 5/1987 | Hartley et al. | 405/128 X |
| 4,687,373 | 8/1987 | Falk et al. | 405/128 |
| 4,726,710 | 2/1988 | Rosar et al. | 405/129 |

FOREIGN PATENT DOCUMENTS

| | | | |
|---|---|---|---|
| 2950462 | 6/1981 | Fed. Rep. of Germany | 405/128 |
| 2562044 | 10/1985 | Fed. Rep. of Germany | 405/128 |
| 3411998 | 10/1985 | Fed. Rep. of Germany | 405/128 |
| 3414400 | 10/1985 | Fed. Rep. of Germany | 405/128 |
| 3502215 | 7/1986 | Fed. Rep. of Germany | 405/128 |

*Primary Examiner*—Randolph A. Reese
*Assistant Examiner*—John Ricci
*Attorney, Agent, or Firm*—Keil & Weinkauf

[57] ABSTRACT

Solid wastes, and wastes to be compacted, are pretreated for introduction into underground salt cavities or salt caverns via a downpipe under the force of gravity by a process in which solid, uncomminuted or comminuted or finely divided to very finely divided wastes are mixed with waste sludges in a ratio such that a material results from which moldings are produced, with or without the addition of a binder, in the form of granules, agglomerates or pellets by a granulation method, or in the form of flakes by a pressing method, the flakes being comminuted to give small moldings, and, if appropriate, the moldings are surface-dried or dried completely, the moldings which are free-flowing under the force of gravity are then trickled into the salt cavity or into the salt cavern and form a pile therein until the said cavity or cavern is substantially full, and, if required, the salt cavity or the salt cavern is closed.

15 Claims, No Drawings

PRETREATMENT OF SOLID WASTES, AND WASTES TO BE COMPACTED, FOR INTRODUCTION INTO UNDERGROUND SALT CAVITIES OF SALT CAVERNS VIA A DOWNPIPE UNDER THE FORCE OF GRAVITY

The present invention relates to a process for the pretreatment of solid wastes, and wastes to be compacted, for introduction into underground salt cavities or salt caverns via a downpipe under the force of gravity.

With an increasing world population, the safe dumping of all wastes produced is of considerable importance for improving the disposal of wastes and hence maintaining the balance in nature.

The technological state of the art has for some years been concerned with underground dumping in cavities and salt caverns for liquid, pumpable wastes with which solid wastes too can be mixed. German Laid-Open Application DOS 3,141,884 relates to the permanent storage of pumpable wastes in caverns in salt deposits, the wastes being compacted in these deposits. German Patent 3,141,885 relates to a process for the storage of completely or partly reusable, liquid wastes in underground cavities enclosed by salt or in salt caverns. Such liquid wastes are said to consist of unsaturated, contaminated solutions, spent acids, phosphate sludges and dilute acids. Pasty, bituminous or solid wastes are to be metered into these liquid wastes predominantly consisting of sludges.

In this prior art, it is important to maintain the pumpable, ie. liquid, state of the mixture of wastes to be dumped underground.

Patent Application P 34 26 960 (West Germany) relates to a process for dumping finely divided, solid wastes in underground cavities enclosed by salt, in particular in salt caverns. The said wastes are trickled through vertical pipelines in order to fill the cavity. To avoid the formation of dust, the freely trickling mixtures are treated with dust-binding agents before or during the trickling process. An aqueous solution of a hygroscopic salt, liquid paraffin or liquid silicone oil is admixed as an agent of this type. The solid wastes described are those formed in the incineration of household refuse. These solid wastes account for from 30 to 40% by weight of the amount involved. Thus, refuse incineration merely results in a reduction in the volume of solids, this reduction being associated with the production of toxic and/or environmentally harmful constituents. Other solid wastes which have been described are those formed as a result of combustion in power stations or industrial plants. Harmful fine dusts are formed during the treatment of stack gases, and solid slags containing soluble substances and slowly dissolving heavy metals which have a toxic effect on the subsoil and the groundwater are produced in the incineration plants.

The dumping of such solid wastes on surface dumps is very expensive and requires monitoring to prevent the seepage of contaminated waters from precipitation or from flowing water. These contaminated waters have to be collected and in turn disposed of and dumped.

In the underground workings too, solid waste containing harmful substances can only be dumped in limited amounts. Moreover, leakproof containers are required for this purpose. For this reason, the dumping of solid wastes in safe underground cavities and salt caverns is becoming more and more important from an economic point of view. It is only in such underground cavities and salt caverns that it will be possible for the amount of solid wastes produced to be safely deposited in the future and on a permanent basis. Since salt deposits are known to occur worldwide, it is possible with existing technology to create the required volume for dumping solid wastes too in these deposits.

German Laid-Open Application DOS 3,411,998 relates to a process for the temporary or permanent storage of solid, finely divided wastes in salt caverns. According to this process, the solid wastes are first mixed with liquid to give a pumpable mixture. The liquid used is an aqueous rock salt solution, which is recycled.

Examples of solid wastes are dry residues from refuse incineration and from combustion in power stations. Other solid residues of this type are salt slacks from the production of light metals and hardening salt residues from metal processing. The solid wastes also include contaminated soils from old dumps or oil spills, as well as filter dusts, ashes and slags from industrial plants.

It is an object of the present invention to provide a process for the pretreatment of solid wastes and wastes to be compacted, so that they can be fed into the underground dump directly via a downpipe, in a freely trickling form.

We have found that this object is achieved, according to the invention, if solid, uncomminuted or comminuted or finely divided to very finely divided wastes are mixed with waste sludges in a ratio such that a material results from which moldings are produced, with or without the addition of a binder, in the form of granules, agglomerates or pellets by a granulation method, or in the form of flakes by a pressing method, the flakes being comminuted to give small moldings, and, if appropriate, the moldings are surface-dried or dried completely, the moldings which are free-flowing under the force of gravity are then trickled into the salt cavity or into the salt caverns and form a pile therein until the said cavity or cavern is substantially full, and, if required, the salt cavity or the salt cavern is closed.

The subclaims relate to further features of the novel process.

The wastes include sludges containing solids, in particular from 15 to 35% by weight of the latter. Gypsum sludges and lime sludges from the absorption of sulfur-containing waste gases are produced in large amounts. The sludges to be dumped include, for example, electroplating sludges as well as phosphate sludges and metal sludges. The process of the invention has the technical and economic advantage that solids in the form of sludges, suspensions, dispersions, emulsions and precipitatable solutions can also be dumped as a mixture with solid, dry wastes without having to be dewatered beforehand. Thus, the technical effect of the process of the invention is that solid wastes in combination with water-containing sludges, suspensions, dispersions, emulsions and precipitatable solutions form solid moist masses which can be converted to agglomerates or granules. These finely divided wastes can be trickled safely into the dump cavity.

In the prior art, solid wastes are simply admixed with liquid, pumpable wastes. In this procedure, the possibility that an excessively high moisture content, unsuitable particle sizes or irregular metering of the loads may produce turbulence in the downpipe cannot always be excluded, such turbulence leading to caking or blockage of the pipeline and hence to operating problems and necessitating expensive measures to eliminate the reduction in cross-section.

Furthermore, the process of the invention restricts the metering of dust-binding agents, where necessary, to fine fractions. As a result of the agglomeration or granulation, the process of the invention permits the wastes to be introduced into the cavity or cavern in a virtually dust-free form through the inlet pipe. Another technical effect of the process of the invention is that a mass which is only slightly compressible, if at all, is formed as a result of trickling solid, shaped particles of the wastes into the caverns. The process of the invention thus permits safe introduction of the wastes into the volume to be filled, and the formation therein of solid masses which are only slightly compressible, if at all. This technical effect makes it possible to master the convergence of the rock pressure. This further technical effect of the process of the invention is alternatively supported by virtue of the fact that a higher compressive strength up to the hardness of concrete is imparted to the resulting agglomerates or granules of the mixture of wastes by means of additives. This further technical effect of the process of the invention is also alternatively backed up by the fact that a higher bulk density is imparted to the resulting agglomerates or granules of the mixture of wastes by adding weight-imparting agents to the moist mass prior to agglomeration or granulation. This further technical effect thus consists in a higher specific gravity and greater strength being imparted to the mass of wastes to be introduced into the volume to be filled, and the specific gravity and the strength of the said mass being adapted to, or even made greater than, those of the surrounding rock salt. By means of this alternative measure, the convergence which occurs is virtually completely avoided, and a slow compression of the cavern volume is prevented. The process of the invention thus substantially improves the safety of underground dumping. In the process of the invention, granules are understood as being finely divided moldings of similar dimensions, produced by a growth or compaction method, agglomerates are understood as being small irregularly shaped pieces produced by growth measures using coating materials, and pellets are understood as being predetermined, finely divided moldings which are predominantly cylindrical. The free-flowing wastes produced by pretreatment according to the process of the invention generally have mean diameters of from greater than 1 mm to about 50 mm in various fractions.

The examples which follow illustrate the process of the invention.

EXAMPLE 1

1000 kg of electrofilter dusts from refuse incineration, having an aerodynamic diameter of <10 μm and containing 300 mg/kg of Cr, 500 mg/kg of Cd, 1,400 mg/kg of Cu, 8,000 mg/kg of Pb and 20,000 mg/kg of Zn as heavy metals are mixed with 120 kg of gypsum sludge having a solids content of 30% by weight, from the chemical industry, in a Lödige mixer, and the mixture is then subjected to granulation by a growth method in a pan granulator and dried. To increase the binding effect and the strength of the granules, the total water content is brought to about 10%, based on dry material, with an aqueous $MgSO_4$ solution containing 6% by weight of $MgSO_4$. The $MgSO_4$ solution is added by spraying it on during granulation. The granules removed from the pan granulator have about 80% of the particles in the range from 1 to 10 mm and about 15% greater than 10 mm on average. The amount of about 5% which is smaller than 1 mm is recycled to the entrance. The compressive strength with the dimension kg/granule is determined with and without the addition of $MgSO_4$ solution, by the following method, using a microprocessor-controlled tablet breaking strength tester from RWK-Apparatebau GmbH, Heusenstamm. In this model experiment, a compressive strength of 5 kg/particle of dried granules is determined without the addition of $MgSO_4$ solution, and a compressive strength of 8 kg/particle with the addition of $MgSO_4$ solution. Thus, the addition of $MgSO_4$ solution as a binder during granulation leads to harder granules. This addition is particularly advantageous when $MgSO_4$ solution is available as such or as spent liquor from the potash industry. This addition also makes it possible to reduce the discharge of the spent liquor into the rivers. As a result of metering in this binder solution, there is the further advantage that even further amounts of solids in the form of wastes can be admixed when the moist material is being adjusted by the process of the invention. The moist granules produced are dried superficially in a rotary tubular oven in a downstream stage of the process and, in a model experiment, then trickled through a vertical pipeline having a length of 3 m and a diameter of 20 cm, under the force of gravity. No caking on the iron pipeline is observed. By metering in hardening agents, such as Portland cement, calcined dolomite or waterglass, the compressive strength is further increased.

EXAMPLE 2

100 kg of residue from stack gas treatment, composed of about 20% by weight of $CaCl_2$, 25% by weight of $CaSO_3/CaSO_4$ and 55% by weight of finely divided dust are mixed with 100 kg of comminuted residue from a powerstation combustion plant and with 50 kg of spent filter material from the mineral oil industry, with the addition of about 80 kg of phosphate sludge having a solids content of about 30% and of about 15 kg of kieserite dust ($MgSO_4$) in a mixing apparatus, and the moist material is introduced onto a pelletizer and forced through horizontal dies. The pellets produced have a diameter of 10 mm and a length of about 40 mm and, in a model experiment, trickle through the pipeline of Example 1 under the force of gravity.

This Example demonstrates the preparation of pellets from a mixture of a plurality of solid wastes and a sludge product. Furthermore, metering in finely divided kieserite dust increases the abrasion resistance and the compressive strength. Alternatively, it is also possible to add hardening agents, such as CaO or Sorel cement ($MgO + MgCl_2$) to further increase the compressive strength.

EXAMPLE 3

A mixture of 100 kg of wastes consisting of comminuted or finely divided salt slags from the production of light metals, Al dross from aluminum production and dusts from the processing of slags is prepared and introduced into a rotary drum with the simultaneous addition of about 30 kg of barium sulfate sludge from the production of chlorine products in the chemical industry and of 5 kg of CaO. During granulation in the rotary drum possessing internal transport elements, the water content is brought to 8–15%, based on the total mixture. In order to avoid caking, the moist material is dried thoroughly on the surface in the same rotary drum. The resulting agglomerates constitute a free-flowing waste product having a particle diameter of about 5–20 mm. The compressive strength of the agglomerates is increased by adding quick lime (CaO) or calcined dolomite (CaO.MgO) in an amount of about 5%. The components can be mixed prior to granulation or directly in the rotary drum.

EXAMPLE 4

10 kg of reproduction wastes from crops are agglomerated with a coating material which consists of an aqueous solution of lime sludge in about 2 kg of water with the addition of 1 kg of finely divided bentonite as a binder, 1 kg of expanded vermiculite as an adsorbent and 0.2 kg of methylcellulose. The production wastes are comminuted into finely divided particles prior to treatment. Agglomeration is carried out in a coating kettle. The agglomerates produced are dried with warm air, after which they can be dumped underground by allowing them to trickle freely through pipelines.

EXAMPLE 5

100 kg of contaminated ammonium sulfate, $(NH_4)_2SO_4$, and 5 kg of spent inorganic filter material together with 8 kg of a waste sludge containing iron sulfate, $FeSO_4$, and 3 kg of quick lime, CaO, are introduced onto a roll press and pressed under 300 kg/cm$^2$ to give flakes. The flaky material is then comminuted to small pellets. These wastes in the form of small pieces can then be passed in a free-flowing manner through a vertical pipe as a model of an inlet pipe to form a pile.

EXAMPLE 6

A mixture of 30 kg of comminuted slag from an incineration plant, 40 kg of fine ash, 30 kg of sewage sludge and 3 kg of Portland cement is prepared, and this mixture is introduced as moist material into a rotary drum and granulated in the latter. Without being classified, the granules produced are fed to a drying drum, in which they are dried. The resulting granules having a particle size of 2–20 mm are passed through a pipeline under the force of gravity in a model experiment, as a free-flowing waste product, and into a collecting vessel as a cavity, in which they accumulate. In order to increase the yield of granules, it is also possible to meter in $MgCl_2$, $MgSO_4$ or an alkali metal silicate solution.

EXAMPLE 7

A mixture is produced, in a positive mixer, from wastes of mineral fibers from glasswool production, of oil-containing adsorbents from the separation of oil from aqueous solutions, and of dicalcium phosphate sludge from the chemical industry, as moist material containing about 6% of water. The mixture is introduced into a pan granulator and granulated in this by spraying with liquid sulfur at above its melting point of about 140° C., after which the granules are hardened on the surface, cooled in a downstream cooling drum to the deposit temperature of about 70° C. and then allowed to trickle freely through a vertical pipeline into a collecting vessel. The process of the invention can be carried out using preheated granulated material and also in a heated granulating apparatus.

EXAMPLE 8

100 kg of filter dusts and 50 kg of comminuted slags, both from a refuse incineration plant, and 1 kg of municipal sewage sludge, are granulated with 90 kg of urea/-formaldehyde condensate having an N content of 38% in a screw granulator, after which the granules are dried in a drying drum at below the softening temperature of the synthetic resin, and a free-flowing waste product having a particle size of about 2–15 mm and 10% of undersize is produced. The undersize is recycled to the feed material to be continuously fed in. The sizes of granules are dependent on the granulation time. The pretreatment by the process of the invention can be carried out batchwise or, over a predetermined period, continuously. It is advantageous if a suitable storage or buffer system is provided upstream of the trickling stage under the force of gravity, in order to permit trickling to be effected uniformly.

The size of the granules is generally controlled via the amount of liquid and the duration and by the technological measures effected in the treatment apparatus. The undersize is generally recycled into the material being mixed. However, it is also possible to treat the undersize with dust binders and to pour it in together with the pretreated wastes. The trickling in of solid, pretreated wastes is dependent on the equivalent or statistical diameters of the pretreated moldings. Larger particles have the advantage of a smaller cross-sectional load in the inlet pipe. The desired size and shape of the moldings can readily be determined by the skilled worker, for example by means of preliminary experiments. Where wastes which are more or less severely contaminated with heavy metals are compacted with fine ash or hydraulic binders according to the prior art, it is intended to prepare a uniform solid mass, which can be walked on, on surface dumps. Even if, on the basis of results obtained in studies, such dumps do not initially produce any seepage water containing harmful substances, there are in the long term insufficient areas available for setting up surface dumps.

It is an attractive proposition to compact the resulting sewage sludges with fine ash and hydraulic binders and store the product on surface dumps in such a way that it can be walked on. Tests aimed at the detection eluates which are free from harmful substances are not adequate as model experiments or as short-term field trials. These tests do not take into account the effect of seasonal stress, particularly as a result of low temperatures and ice formation. Such tests aimed at demonstrating suitability for surface dumping are furthermore not typical of the durability of such dumps over decades. However, as soon as cracks have formed in the course of years, as in earth formations and rocks, water will be able to enter, have a disintegrating effect and consequently produce fissures, and, after years or decades, uncontrollable, contaminated seepage water may be formed, such water acting as a source of continuous or periodic pollution of the groundwater, rivers and the earth.

This danger cannot be excluded by short-term experiments under constant climatic conditions. Moreover, it should be borne in mind that, when fine ash is used as a binder, adequate strength of the uniform mass is achieved only when hydraulic binders are also added. However, the addition of fine ash and dusts results in a higher concentration of heavy metals in the bound and stacked material consisting of wastes. This substantially increases the risk of subsequent contamination of penetrating seepage waters. Heavy metals and other environmentally harmful ions in materials bound with fine ash will be made available to the waters, in the form of a concentrate, while the waters act on such surface stacks over years and decades. According to Wasser, Luft und Betrieb, Zeitschrift für Umwelttechnik, issue 6.83, pages 49–50, for example, Neckar sludge has the following contents of heavy metals: 3.6 ppm of Fe, 460 ppm of Mn, 1055 ppm of Zn, 340 ppm of Cu, 700 ppm of Cr, 95 ppm of Ni, 240 ppm of Pb, 9.5 ppm of Co, 52 ppm of Cd and 20 ppm of As. When sludges of this type are bound with fine ash from refuse incineration plants, further amounts of environmentally harmful metals are added, which increase the concentration as well as the overall amount. According to Wasser, Luft und Betrieb, loc. cit., a fine ash from refuse incineration has the following contents of heavy metals: 50,181 mg/kg of Fe ($Fe_2O_3$), 3,412 mg/kg of Pb (PbO), 21,406 mg/kg of Zn (ZnO), 610 mg/kg of Ni (NiO), 133 mg/kg of Cd (CdO), 2,048 mg/kg of Cr ($Cr_2O_3$) and 1,423 mg/kg of Cu (CuO). This considerable risk of future environmental pollution by surface dumps is avoided by the process of the invention. The dimensions of the granules, agglomerates and pellets according to the process of the invention are understood as being those which have an average magnitude which permits trickling through the inlet pipe under the force of gravity. According to A. G. Kassatkin, Chemische Verfahrenstechnik, 1 (1962), 54, this equivalent diameter is defined as follows:

$$D_{equiv.} = \frac{2 a \cdot b}{a + b}$$

where a and b are the measurable dimensions of width and length.

The process of the invention has the technical advantage that the size fractions of pretreated molded particles can vary within wide limits, provided that the free-flowing properties under the force of gravity are guaranteed. Precisely with regard to the statistical particle size distribution from small to large molded particles, the process of the invention has the unexpected technical effect that utilization of the cross-section of the inlet pipe as a result of too much material on the cross-section is virtually completely absent, and an excessive drop in the static pressure in the pipeline is therefore avoided. The generation of a pressure drop in a flowing medium is familiar from the entrainment effect of water pumps. This technical effect of the process of the invention makes it possible virtually completely to avoid the risk of caking or blockages. The process of the invention thus has the advantage of high operational reliability, due to the fact that moldings having different particle sizes and graduated equivalent diameters are trickled in.

In the process of the invention, the yield of granules or agglomerates is increased by adding binders. Alternatively, and preferably, aqueous solutions of waste liquors for the potash industry are used, these liquors containing $MgCl_2$ and $MgSO_4$. Such salt solutions from the process for manufacturing potassium fertilizer salts are referred to as waste liquors. This technical expression means that these solutions cannot be worked up because of the excessively high energy requirement for this purpose. These aqueous solution therefore have to be discarded. When they are fed into rivers or pumped into underground deposits, for example into sheet dolomite, the courses of the rivers and the deposits are polluted. Furthermore, substantial pumping energy is required to force the solutions into deeper rock formations. It is therefore a technical advantage of the process of the invention if such salt solutions, which in turn, in excess amounts, are to be regarded as wastes, can be fed to the underground dump together with solid wastes by the process of the invention. If some of the water is to be bound when the sludges used have a fairly high water content, it is advantageous to meter in anhydrous kieserite dust or kieserite, $MgSO_4.H_2O$, during the pretreatment. This binder has the technical advantage that no after-drying is required. The hardening agents used in the process of the invention increase the strength of the pretreated particles in the form of moldings. The increase in compressive strength can be adjusted by means of the additional amount of these agents. It is advantageous if the ratio is determined by preliminary experiments. Compressive strengths of from 30 to 50 or up to 90 or up to $130 N/cm^2$ or higher can be obtained with sludges, fine ash and binders in amounts of 3–10% by weight, based on the solids. If fine ash is mixed with solid wastes and sludges according to the process of the invention, without a binder, the compressive strength is low, depending on the amount of fine ash, which is in particular about 85%, based on the sludge. The compressive strength may be, for example, only from 0.5 to 2.0 bar. However, if surface drying is carried out after the pretreatment according to the process of the invention, this compressive strength may be sufficient for trickling under the force of gravity into the cavity or salt cavern. Binders which become hydrated, preferably kieserite dust, $MgSO_4$, also have a hardening effect by increasing the compressive strength. Hence, small amounts of 1–6% by weight of this binder are generally sufficient for the pretreatment to achieve granulation together with the technical effect of simultaneously increasing the compressive strength of the moldings. By metering in hardening agents, the compressive strength can be substantially increased. To carry out the process of the invention reliably, it is essential to maintain laminar flow, particularly when trickling is stopped. Abrupt stopping of trickling or an excessively rapid reduction in the volume flow may give rise to turbulent flow, which causes spraying of the material sideways onto the pipe wall and hence leads to caking. In extreme cases, even blockages may result; because they have to be eliminated, these blockages lead to operational problems and interruptions.

By the alternative and preferred control of the volume of inflowing wastes, and by means of a preferred continuous and gradual volume reduction up to shutdown and during start-up of the trickling procedure after shutdowns in the case of periodic introduction of pretreated wastes, and by avoiding an excessively high cross-sectional loading of the pipeline during the trickling procedure, the process according to the invention can be controlled so that laminar flow is maintained during trickling and does not approach the critical limit too closely.

For dumping solid or compacted wastes, the process of the invention has the technical advantage that it permits safe and invisible dumping underground in cavities and salt caverns which are available in salt deposits in the required capacity or can be produced for this purpose by leaching, this being true for the future too. The process of the invention permits underground dumping of solid wastes and sludges which are produced in substantial and increasing amounts by waste gas treatment and which in future it will not be possible to dump above-ground because no further space is available for this purpose, and the danger of pollution of the soils and rivers and of the groundwater by harmful substances over prolonged periods cannot be excluded. The process of the invention also has the technical advantage that, by dumping the pretreated wastes, preferably increasing the compressive strength and the specific gravity of the moldings, the convergence in salt caverns can be substantially eliminated and brought to a stop. Hence, the caverns which are substantially filled with solid wastes can be closed off. In addition to technical advantages, the process of the invention, in conjunction with the alternative embodiment for the dumping of solid or compacted wastes in underground cavities and salt caverns, which can be regarded as safe, also has substantial overall economic significance because of its contribution to the creation of a clean environment.

We claim:

1. A process for the pretreatment of solid wastes, and wastes to be compacted, for introduction into underground salt cavities or salt caverns via a downpipe under the force of gravity, wherein solid, uncomminuted or comminuted wastes are mixed with waste sludges in a ratio of solid wastes to waste sludges of from 60:40 to 95:5, based on the sum of the substances as 100% by weight, and the water content of the dry wastes is adjusted by the addition of an aqueous salt solution to from 1 to 15% by weight, based on the total amount of dry wastes, and from the resulting material moldings are produced in the form of granules, agglomerates or pellets, and, if appropriate, the moldings are surface-dried or dried completely and are then allowed to flow into the salt cavity or salt cavern and form a pile therein until the said cavity or cavern is substantially full, and, if required, the salt cavity or salt cavern is closed.

2. A process as claimed in claim 1, wherein solid wastes consist of filter dusts, fine ash, slags, residues from refuse incineration or from combustion at power-stations or from other industrial processes, or of inorganic salts contaminated with harmful substances, or of earths polluted with oils or heavy metals or of pasty substances or organic wastes.

3. A process as claimed in claim 1, wherein agglomeration or granulation of the moist material of the wastes is effected by growth granulation using rotary drums or rotating disks or using oscillating screens, and by forced granulation with presses to give pellets or flakes, and comminution of these to give fine-particled wastes in the form of moldings, or by forced granulation using a screw press and comminution of the emerging material.

4. A process as claimed in claim 1, wherein the solid wastes are dried by means of hot air or stack gases flowing cocurrent or countercurrent, at a temperature which does not produce any change in the agglomerates or granules or in the fine-particled wastes, and the air saturated with steam is removed.

5. A process as claimed in claim 1, wherein the agglomerates or granules or particulate wastes are trickled in by controlling the inflowing volume as throughput per unit time, and/or the inlet pipe for trickling in the pretreated solid wastes is raised as the cavity or cavern becomes fuller, and/or the solid pretreated wastes are trickled in periodically and in the intermediate periods liquid wastes or aqueous waste solutions or aqueous solutions or water are introduced in a restricted amount so that the pile of solid wastes is broken up.

6. A process as claimed in claim 1, wherein, in the periods between trickling in the pretreated wastes onto the volume of wastes which has been trickled in, one or more top layers of higher strength are formed, these layers consisting of bound or hardened materials, and/or greater strength is imparted to the top layers by means of a hydraulic binder, a Sorel binder or a synthetic resin binder, and/or the materials which impart higher strength to the top layers are introduced in dry form into the cavern and reacted only when inside the cavern by adding the aqueous phase or the component which produces hardening.

7. A process as claimed in claim 1, wherein free-flowing moldings, such as agglomerates or granules of relatively high strength, are prepared by adding hardening agents, and cement, Portland cement, Sorel cement, Al phosphate, $NH_4$ phosphate, siliceous earth, finely divided silica, an alkali metal silicate, calcined magnesite (MgO), calcined dolomite (MgO.CaO), quick lime (CaO), waterglass, a synthetic resin, an epoxy resin, a urea, melamine or phenol/formaldehyde resin or a combination of these inorganic and organic substances is used as the hardening agent.

8. A process as claimed in claim 1, wherein the bulk density (g/l) of the agglomerates or granules is increased by metering in metal wastes, such as iron wastes, or a heavy inorganic material, such as barite, or a heavy metal salt, such as $FeSO_4$.

9. A process as claimed in claim 1, wherein bactericides are added to wastes and mixtures of wastes which lead to biological activity and hence to the formation of gases, in order to prevent such reactions, and/or dust-binders are added to the solid, trickling moldings in order to avoid or reduce dust formation on landing in the lower volume of the cavity or of the salt cavern, and/or substances having a thixotropic effect, such as bentonites, are metered into the solid, trickling wastes, or such substances themselves are trickled into the cavity or salt cavern and these substances are then converted therein to the thixotropic state by the compressive pressure of the dumped wastes or, if necessary, by introducing aqueous liquids, in order to shift the vertical convergence vectors.

10. A process as claimed in claim 1, wherein the volume of wastes trickling in is controlled so that the pressure drop as a result of the increasing velocity of fall of the flowing material does not decrease significantly, in order to avoid deposits or vibration of the pipeline, and/or so that the inlet pipe for trickling in the pretreated, solid wastes is kept short in the upper part of the cavity or salt cavern, in order to avoid the formation of piles through a distributing effect due to the weight of the material landing in the lower volume, or to flatten such piles.

11. A process as claimed in claim 1, wherein the solid wastes are trickled in uniformly and continuously in such a way that laminar flow is maintained in the pipeline and, if necessary, the amount is reduced virtually continuously until the trickling procedure is stopped, in order to avoid producing turbulent flow and caking or blockages.

12. A process as claimed in claim 1, wherein moldings consisting predominantly of inorganic wastes are brought to a compressive strength of about $30-100 N/cm^2$, measured after from 1 to 3 days, with binders and fine ash, or moldings containing organic wastes are brought to a minimum compressive strength of from more than 2 to $5 N/cm^2$, measured after from 1 to 8 days, with binders and fine ash and, if appropriate, with inorganic adsorbents, or wastes containing predominantly organic material are converted to free-flowing agglomerates by means of a coating material.

13. A process as claimed in claim 1, wherein the pretreated wastes trickle in under the force of gravity at a loading of the cross-section of the pipe which is such that this area is loaded only to an extent of 50–80% by the equivalent diameter of the trickling moldings, and consequently the pressure drop in the lower part of the downpipe is so small that laminar flow of the material is maintained, and/or a conveying element, such as a curved conveyor belt or a channel, is provided upstream of the trickling wastes before the entrance to the virtually vertical pipeline, if necessary with a limit for the layer height in order to balance or regulate the amount.

14. A process as claimed in claim 1, wherein the moldings are produced by adding solid or dissolved binders, such as $MgCl_2$, $MgSO_4$, kieserite, spent liquors from the potash industry, bentonite, bitumen, paraffin, sulfur, or methylcellulose.

15. A process as claimed in claim 1, wherein the solids content is adjusted by adding absorbents, such as kieselguhr, expanded vermiculite or expanded perlite, and/or waste sludges are prepared from finely divided wastes and aqueous solutions and are employed as components of the mixture and the mixture is brought to a constant solids content.

* * * * *